Feb. 18, 1969  L. KLEIN  3,428,330
ADJUSTABLE LOAD RACK FOR TRUCKS
Filed Jan. 12, 1967  Sheet 3 of 4
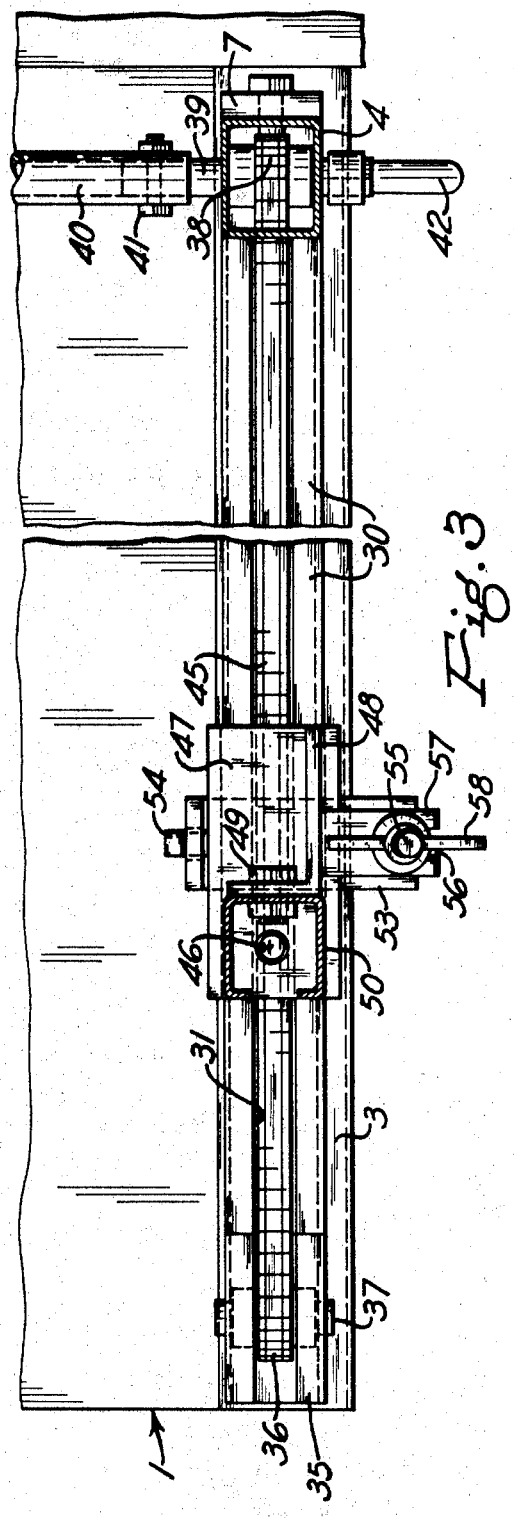
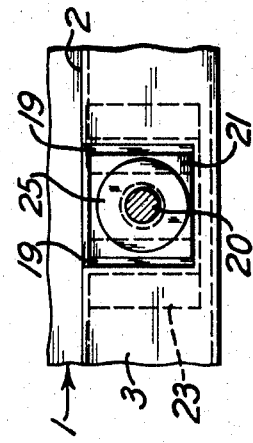
INVENTOR.
LUDWIG KLEIN
BY
Brown, Critchlow, Flick & Peckham
ATTORNEYS.

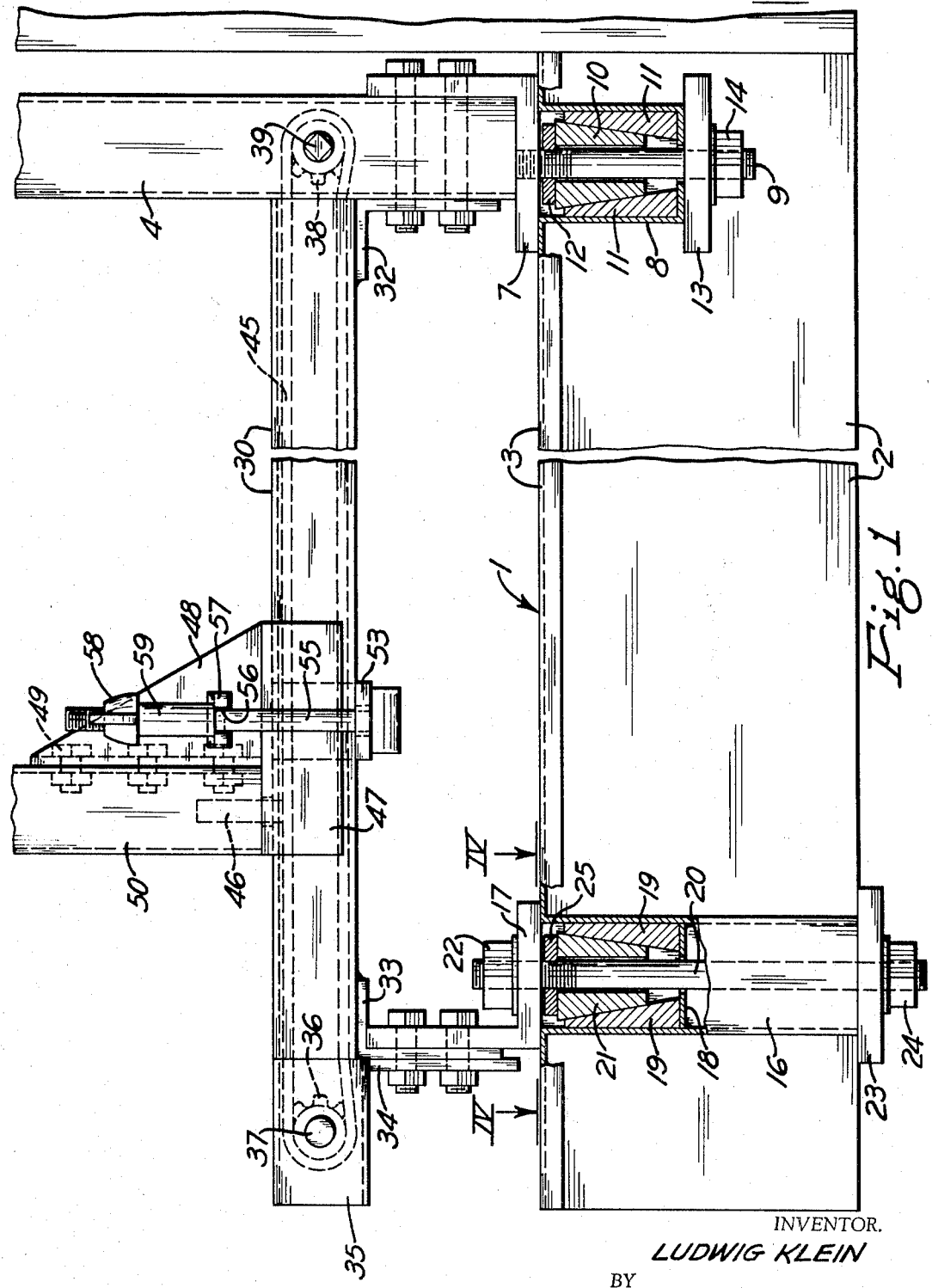

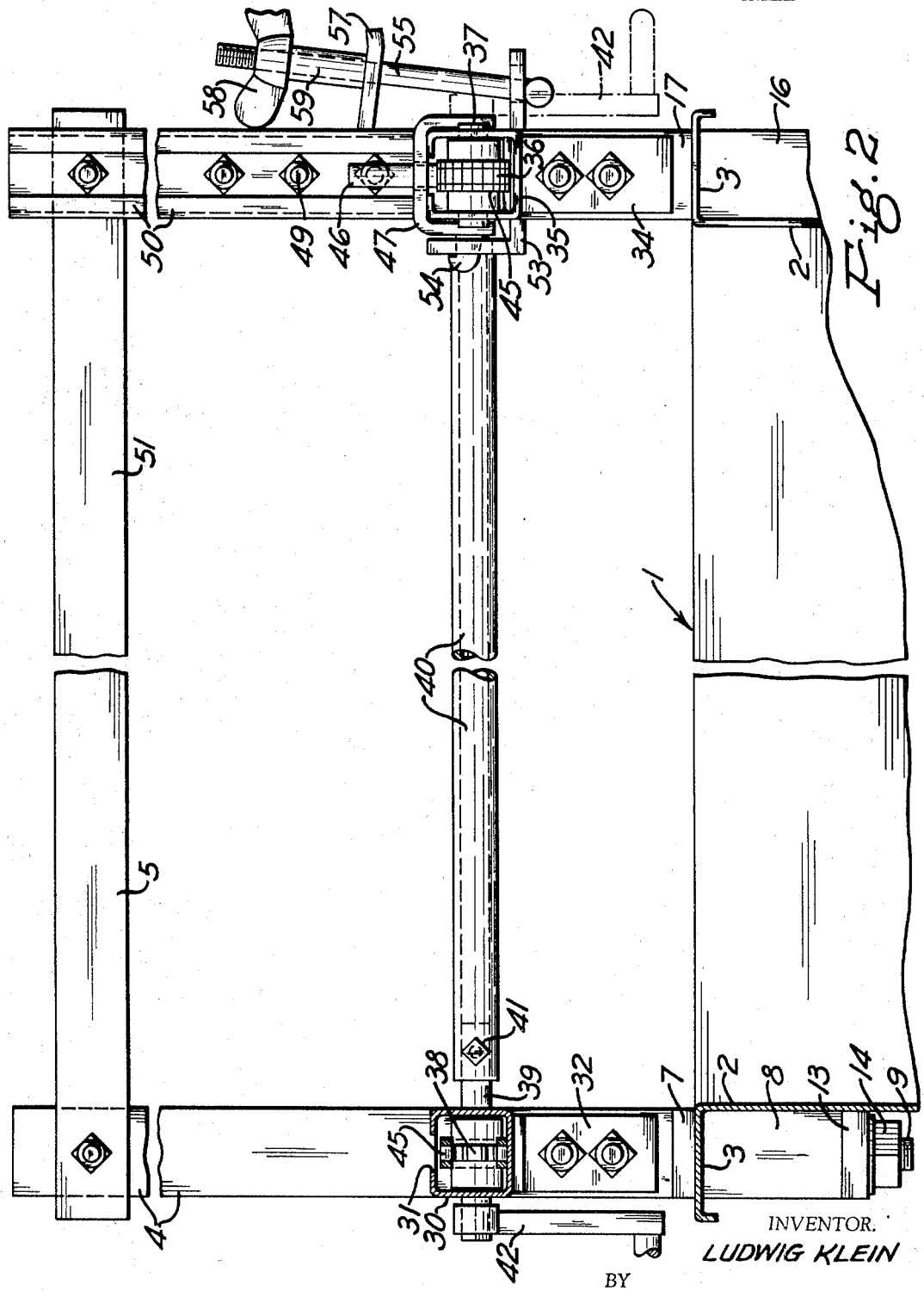

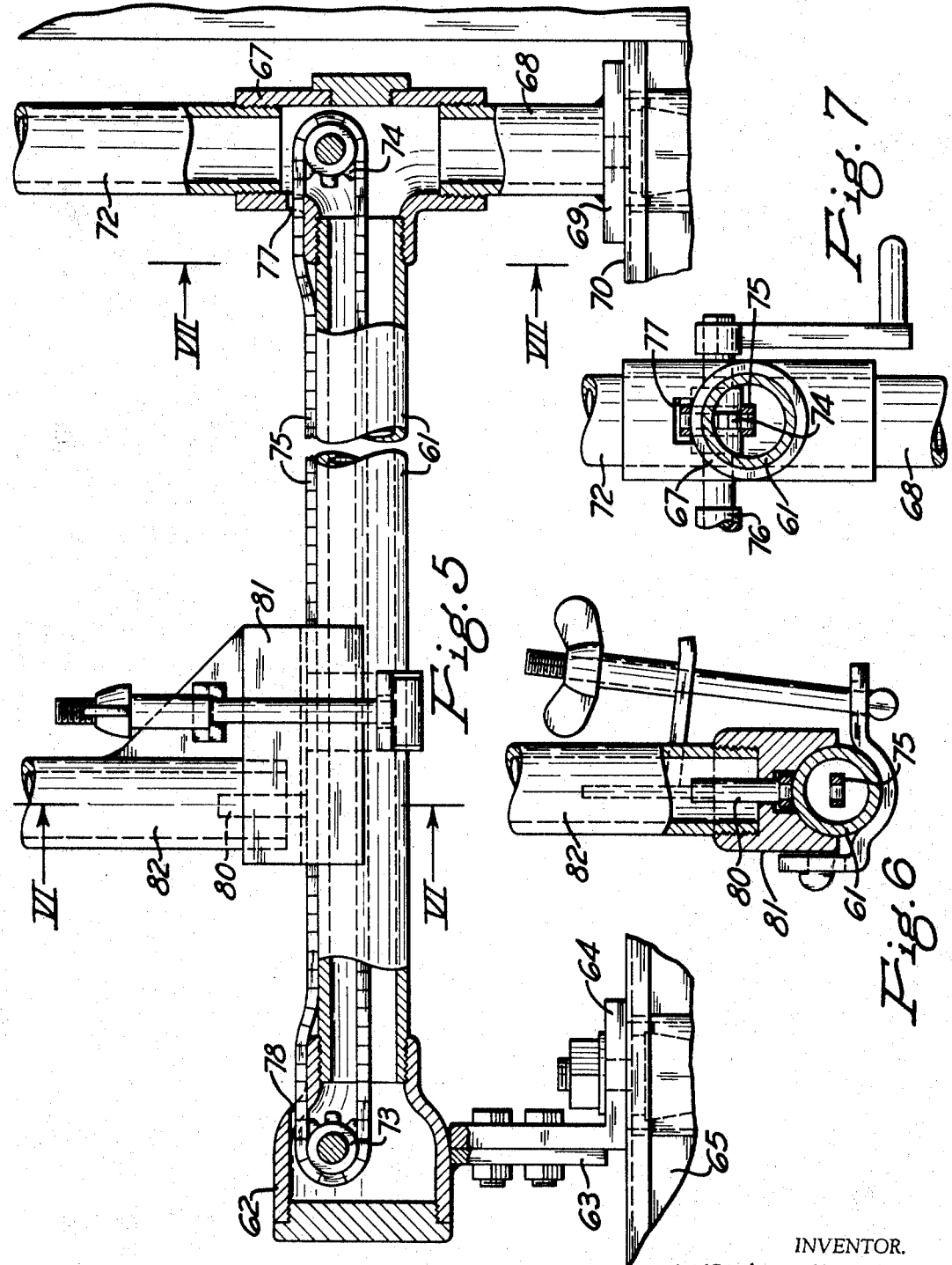

United States Patent Office 3,428,330
Patented Feb. 18, 1969

3,428,330
ADJUSTABLE LOAD RACK FOR TRUCKS
Ludwig Klein, R.D. 7, P.O. Box 63,
Gibsonia, Pa. 15044
Filed Jan. 12, 1967, Ser. No. 608,772
U.S. Cl. 280—179                                    8 Claims
Int. Cl. B60p 7/00

ABSTRACT OF THE DISCLOSURE

A load retaining rack for the open body of a truck and having a pair of horizontal hollow rails attached to the opposite sides of a truck body, with sprockets mounted at the ends of the rails to support endless chains, the lower lengths of which extend through the rails. A shoe, slidable along the top of each rail, is connected to the upper length of the underlying chain and supports a vertical post forming part of a load-retaining rack. When the sprockets are rotated, the shoes and posts are moved along the rails.

It is among the objects of this invention to provide for the open body of a truck a load-retaining rack that can be adjusted along the truck by turning a crank, rather than by manually pushing or pulling the rack as in my Patent No. 3,229,994.

The invention is illustrated in the accompanying drawings, in which:

FIG. 1 is a fragmentary side view, partly in vertical section, of my adjustable rack;

FIG. 2 is a fragmentary rear view of the rack with the left-hand half in section;

FIG. 3 is a fragmentary horizontal section of one side of the rack;

FIG. 4 is a horizontal section taken on the line IV—IV of FIG. 1;

FIG. 5 is a fragmentary side view, partly in vertical section, of a modification; and FIGS. 6 and 7 are vertical sections taken on the lines VI—VI and VII—VII, respectively, of FIG. 5.

Referring to FIGS. 1 and 3 of the drawings, a truck has an open body 1 provided with vertical walls 2 along its opposite sides. Such a truck body also is shown in my Patent No. 3,229,994. The side walls are provided with outwardly projecting top flanges 3. A pair of hollow rectangular posts 4, connected by a cross bar 5 (FIG. 2), are rigidly mounted at the front end of the body by bolting their lower ends to the sides of anchor brackets 7 that are rigidly connected to the side walls of the truck body. The connection is made without having to drill holes in the flanges, because it utilizes the usual vertical sleeves 8 that are welded by the body manufacturer to the side walls beneath rectangular openings in their flanges so that stakes can be inserted which will project above the walls. Since the sleeves and flange openings vary somewhat in size, and the bolts 9 that fasten brackets 7 in place are much smaller than the sleeves, the upper end of each bolt is screwed into the bottom of a bracket and a wedge 10 is slidably mounted on the bolt inside a sleeve. The wedge is rectangular in horizontal section and bears against a pair of wedges 11 seated in the sleeve. A small plate 12 is threaded on the bolt above the wedge, and another plate 13 is slidably mounted on the bolt beneath the sleeve. A nut 14 on the lower end of the bolt pulls bracket 7 downward after the small plate 12 has been adjusted along the bolt so that it will force wedge 10 tightly against wedges 11 to prevent the bolt from moving sideways. The bracket may seat on the underlying flange or be spaced a slight distance from it. In either case, the bracket will be held firmly in position by the bolt and wedges.

Near the rear end of each side wall 2 there is another vertical sleeve 16 beneath a flange opening and an anchor bracket 17 above the opening. A plate 18, with a central hole through it, is welded in the central part of the sleeve, and a pair of wedges 19 rest on the plate on opposite sides of a bolt 20 extending through the sleeve. These wedges are engaged by a wedge 21 slidably mounted on the bolt, the upper end of which extends through bracket 17 and carries a nut 22 while the lower end extends down through a plate 23 that is held in place by another nut 24. A small plate 25 is threaded on the bolt between the wedges and bracket as shown in FIGS. 1 and 4. When the nuts are tightened, the bracket is held in place in the same way as those previously described. The upper nut can be tightened enough to press the bracket firmly against the side wall flange.

Extending along each side of the truck body above the front and rear brackets is a horizontal hollow rail 30. The rail is rectangular in vertical section and has a slot 31 in its upper wall extending from end to end. The front end of the rail is welded to the top of a bracket 32 that is bolted to the back side of the front post 4. The rear end of the rail is welded to another bracket 33 that is bolted to the upright portion of the rear anchor bracket 17. Also bolted to these last two brackets is a vertical plate 34 that supports a short hollow housing 35 engaging the rear end of the adjoining rail and aligned with it. A vertical sprocket 36 inside the housing is mounted on a short transverse shaft 37 journaled in the sides of the housing. A similar sprocket 38 inside the front post is rigidly mounted on a transverse shaft 39. The two front sprocket shafts are rigidly connected together, such as by a pipe 40 slipped over their inner ends and connected to them by bolts 41 or the like. The outer ends of the two shafts are square for receiving a crank 42 for turning the sprockets.

An endless chain 45 extends around each pair of sprockets and through the hollow rail between them. The back side of the front post is provided with an opening, through which the chain can pass. Rigidly secured to the upper length of the chain and extending up through slot 31 in the rail is a pin 46. This pin extends up through a hole in a shoe 47 that is seated upon the rail. The shoe has downwardly extending sides that prevent it from moving laterally. Such a shoe can be made from a short length of an inverted channel. Secured to the top of each shoe is a bracket 48, through which bolts 49 extend to fasten the lower end of a hollow vertical post 50 to the shoe. The pin 46 extends up into the post. The two rear posts may be connected by a vertically adjustable cross bar 51. It will be seen that the shoes, rear posts and cross bar form a rigid load-retaining rack frame that can be slid forward and backward along the parallel rails.

In order to hold this frame on the rails and also to lock it in any desired position along them, clamping means are provided. Each such means preferably includes a clamping plate 53 that extends across the bottom of the overlying rail. The inner end of the plate is hinged to the inner side of the shoe, while the opposite end of the plate projects from the outer side of the shoe and can be drawn upwardly by suitable means to clamp the plate tightly against the bottom of the rail in order to hold the shoe in fixed position. The hinge connection between the clamping plate and shoe may be formed by extending the inner end portion of the plate upwardly beside the shoe and providing it with an opening to loosely receive a hook 54 projecting from the adjacent side of the shoe. For raising the outer end of the plate it is preferred to use a T-bolt 55 extending up through an oversize hole in the projecting outer end of the plate, with the head of the bolt engaging the bottom of the plate. The bolt also extends up through a slot 56 formed in the outer end of a rigid forked lug 57 that projects laterally from the side wall of bracket 48 carried by the shoe. To hold the bolt in position and to pull upwardly on it so that it presses the clamping plate tightly against the bottom of the rail, a thumb nut 58 is screwed on the upper end of the bolt for pressing down on the forked lug through an intervening sleeve 59.

When it is desired to adjust the rear posts along the side rails, the shoe clamps are loosened so that the shoes can be slid along the rails in either direction. This movement of the shoes is accomplished by turning the front sprockets, which will move the chains and the pins 46 and thereby the shoes. Since the chains are moved in unison, the rear posts will be moved in the same way. One operator, by merely turning a crank at either side of the truck near the cab, can move the rack frame backward or forward very quickly. When it has reached the desired position he need only to tighten the clamps on the shoes to lock the frame in place. By completely releasing the clamps, the rack frame can be lifted off the rails.

If desired, the chains can be motor driven. In either case, it is unnecessary for two men to climb into the truck body and then each push or pull a shoe along a rail so that both sides of the rack frame will move together and not bind on the rails. Stress on the clamped frame and rails is taken by the side walls of the body and the bottom of the body through the vertical bolts and sleeves, instead of being concentrated in the side wall flanges which are not as rigid.

In the modification shown in FIGS. 5, 6 and 7 the rails 61 and posts are made from pipes. Each rear sprocket housing 62 is screwed onto the rear end of a rail and is welded to a plate 63 bolted to a bracket 64 connected to the truck body side wall 65 in the same way as first described herein. The front end of each rail is screwed into a pipe T 67 supported by a bracket in the form of a short length of pipe 68 welded to the top of a plate 69 seated on the side wall flange 70. The front post 72 is screwed into the upper end of the T. Rotatably mounted in the rear housing and the front T or housing are sprockets 73 and 74, around which a chain 75 extends. The front sprockets are rigidly connected by a shaft 76 (FIG. 7) between them. The lower length of the chain extends through the rail, but its upper length is located above the rail. Consequently, the front and rear sprocket housings are provided with openings 77 and 78 to allow the upper length of the chain to enter and leave them.

Mounted on the upper length of each chain is a vertical pin 80 that extends up through a hole in a shoe 81 seated on the pipe rail. This shoe is clamped in place in the same way as the one previously described. Screwed into the top of the shoe around the pin is the lower end of a rear post 82. The two rear posts are connected by a cross-bar (not shown). When the clamps are loosened, the front sprockets can be turned by a crank to slide the shoes forward or backward on the rails to the desired position.

I claim:

1. An adjustable load-retaining rack for the open body of a truck, comprising a pair of spaced parallel horizontal hollow rails, means for attaching the rails to the top of the opposite sides of the truck body, a pair of sprockets journaled on parallel axes at the ends of each rail, an endless chain extending around each pair of sprockets and having its lower length extending through the rail, a shoe slidable along the top of each rail, means connecting each shoe to the upper length of the underlying chain, a vertical post above each shoe and rigidly connected to it, and means for rotating said sprockets to adjust the shoes along the rails.

2. A rack according to claim 1, in which said shoes are provided with upwardly extending openings, and said connecting means are pins mounted on the chains and projecting up into said shoe openings.

3. A rack according to claim 1, in which said rails are open-top channels, and said sprockets are journaled in separate housings rigidly mounted at the ends of the channels, the housings at one end of the channels being formed by stationary hollow vertical posts.

4. A rack according to claim 3, in which said hollow posts extend below the channels and form part of said attaching means.

5. A rack according to claim 1, in which said rails are pipes through which only the lower lengths of the chains extend, the upper lengths of the chains being disposed above the pipes.

6. A rack according to claim 5, in which said sprockets are journaled in fittings secured to the ends of the pipes and having openings above the pipes for the upper lengths of the chains.

7. A rack according to claim 6, in which the fittings at one end of the pipes support stationary posts and form part of said attaching means.

8. The combination with the open body of a truck having side walls with horizontal flanges at their tops provided near their front and rear ends with openings, and vertical sleeves attached to said side walls and extending downwardly from said openings; of a horiztontal rail extending along each of said side walls above its flange, brackets connected with said rails and disposed over said flange openings, bolts mounted in said brackets and extending down through said sleeves, means at the lower ends of the bolts anchoring the bolts in the sleeves to hold the brackets in place, a downwardly tapered wedge on each bolt within the surrounding sleeve, a pair of wedges mounted in each sleeve and engaged by a bolt wedge to hold the bolt against lateral movement, a pair of sprockets journaled on parallel axes at the ends of each rails is taken by the side walls of the body and the bottom sprockets and having its lower length extending through the rail, a shoe slidable along the top of each rail, means connecting each shoe to the upper length of the underlying chain, a vertical post above each shoe and rigidly connected to it, and means for rotating said sprockets to adjust the shoes along the rails.

References Cited

UNITED STATES PATENTS

| 2,388,304 | 11/1945 | Ackerman et al. | 280—179 |
| 2,668,629 | 2/1954 | Dahlman | 214—83.2 |
| 3,229,994 | 1/1966 | Klein | 280—179 |

BENJAMIN HERSH, *Primary Examiner.*

J. E. SIEGEL, *Assistant Examiner.*